US012646888B2

(12) United States Patent
Barber et al.

(10) Patent No.: US 12,646,888 B2

(45) Date of Patent: Jun. 2, 2026

(54) COUPLING SYSTEMS HAVING REPEATABLE POSITIONING PRECISION

(71) Applicant: Safran Defense & Space, Inc., Bedford, NH (US)

(72) Inventors: Ross Barber, Goffstown, NH (US); Michael Blundell, Windham, NH (US)

(73) Assignee: Safran Defense & Space, Inc., Bedford, NH (US)

( * ) Notice: Subject to any disclaimer, the term of this patent is extended or adjusted under 35 U.S.C. 154(b) by 427 days.

(21) Appl. No.: 18/233,484

(22) Filed: Aug. 14, 2023

(65) Prior Publication Data

US 2025/0062571 A1 Feb. 20, 2025

(51) Int. Cl.

*H01R 13/20* (2006.01)
*H01R 13/629* (2006.01)
*H01R 13/639* (2006.01)

(52) U.S. Cl.

CPC ....... *H01R 13/62955* (2013.01); *H01R 13/20* (2013.01); *H01R 13/639* (2013.01)

(58) Field of Classification Search

CPC .. H01R 13/62955; H01R 13/20; H01R 13/24; H01R 13/639; H01R 13/73; F41G 11/005; F41G 11/007; F41G 11/00; F41C 27/00; G03B 17/56

USPC .......................................................... 439/326

See application file for complete search history.

(56) References Cited

U.S. PATENT DOCUMENTS

| | | | | |
|---|---|---|---|---|
| 4,666,276 | A | 5/1987 | Chan | |
| 7,431,247 | B2 | 10/2008 | Bobro | |
| 8,113,862 | B2 * | 2/2012 | Wei | H01R 12/7005 439/328 |
| 8,468,735 | B1 * | 6/2013 | Keng | F41G 1/08 42/148 |
| 8,490,313 | B2 | 7/2013 | Frascati et al. | |
| 8,657,619 | B2 * | 2/2014 | Lin | G06F 1/185 439/328 |
| 9,689,646 | B1 | 6/2017 | Story et al. | |
| 10,466,011 | B2 | 11/2019 | Swan et al. | |

(Continued)

FOREIGN PATENT DOCUMENTS

| | | |
|---|---|---|
| CN | 203786450 U | 8/2014 |
| CN | 217360524 U | 9/2022 |

OTHER PUBLICATIONS

Niceyrig Quick Release Base Plate Compatible with Manfrotto 577, 501, 504, 701 for DSLR Camera 15mm Rail Support System. (Nov. 19, 2019).

*Primary Examiner* — Tulsidas C Patel
*Assistant Examiner* — Carlos E Lopez-Pagan
(74) *Attorney, Agent, or Firm* — Downs Rachlin Martin PLLC

(57) ABSTRACT

Coupling systems that each include a pivot connector set and a locking connector set. First and second parts of each coupling system are coupled to one another by engaging components of the pivot connector set with one another and then at least one of the first and second parts is pivoted relative to the other of the first and second parts so as to engage components of the locking connector set with one another. In some embodiments, a coupling system of the present disclosure may be deployed with a pair of hot shoe connectors, with a pivoting action of the coupling system providing a straight-in type engagement of the hot shoe connectors with one another.

24 Claims, 10 Drawing Sheets

(56) References Cited

U.S. PATENT DOCUMENTS

| | | | | |
|---|---|---|---|---|
| 10,886,646 | B2 * | 1/2021 | Goupil | H01R 24/68 |
| 10,962,332 | B2 | 3/2021 | Curry | |
| 11,561,068 | B1 | 1/2023 | Carter et al. | |
| 2012/0181406 | A1 * | 7/2012 | Gonzalez | F41G 11/003<br>248/316.2 |
| 2020/0326157 | A1 * | 10/2020 | Curry | F41A 21/484 |
| 2023/0064118 | A1 | 3/2023 | Stabler | |

* cited by examiner

COUPLING SYSTEMS HAVING REPEATABLE POSITIONING PRECISION

FIELD

The present disclosure generally relates to the field of precision coupling systems. In particular, the present disclosure is directed to coupling systems having repeatable positioning precision.

BACKGROUND

Coupling systems for coupling together various devices are used in many settings. For example, in militaries, various auxiliary devices, such as position & orientation units and optical scopes and lasers, etc., that require highly precise alignment need to be coupled to imaging devices, rifles, other firearms, etc. Various tactical rail systems for firearms, such as the 1913 Picatinny rail system, among others, have been developed and deployed for allowing users to quickly attach such and other auxiliary devices. However, these rail systems do not always provide the repeatable precision desired/needed for mounting these devices without the need to make any field adjustment. Device-specific, custom, mounts can be used in the alternative. However, such custom mounts typically are not easily field serviceable and can be prone to damage and/or fouling in the field from environmental conditions, such as mud, soil, and sand, among others.

SUMMARY

In one implementation, the present disclosure is directed to a coupling system for removably coupling first and second objects to one another. The coupling system includes a a first coupling part corresponding to the first object; and a second coupling part corresponding to the second object and designed and configured to engage the second coupling part and to couple with the first coupling part so as to removably couple the first and second objects to one another when the first and second objects are present; wherein: the first and second coupling parts include a pivot connector set and a locking connector set spaced from the pivot connector set along a separation axis extending between the pivot connector set and the locking connector set when the first and second coupling parts are coupled with one another; the pivot connector set includes a first head and a first receiver located, respectively, on differing ones of the first and second coupling parts, the first receiver including: a head-receiving region for receiving the first head therethrough when the first head is first engaged with the first receiver; and a head-capture region for capturing the first head in the first receiver after the first head has been engaged with the head-receiving region; the locking connector set includes: a second head and a second receiver located, respectively, on differing ones of the first and second coupling parts, wherein the second head is engageable with the second receiver when the first head of the pivot connector set is engaged with the head-capture region of the first receiver; and a locking mechanism for locking the second head in the second receiver when the first head is captured in the head-capture region of the first receiver and the second head is in the second receiver.

In another implementation, the present disclosure is directed to a hot-shoe assembly for communicating electrical signals between a first and a second objects. The hot-shoe assembly includes a first hot-shoe connector designed and configured to be operationally engaged by a second hot-shoe connector having a first set of electrical contacts, the first hot-shoe connector including: a body; and a second set of electrical contacts fixedly located on the body; a swappable component removably coupled to the body and including: a third set of electrical contacts for contactingly engaging the first set of electrical contacts when the first and second hot-shoe connectors are coupled with one another; and a fourth set of electrical contacts in electrical communications with the third set of electrical contacts and contacting the second set of electrical contacts; and a securement means removably securing the swappable component to the body.

In yet another implementation, the present disclosure is directed to a coupling system for removably coupling first and second objects to one another. The coupling system includes a first coupling part designed and configured to be mechanically coupled to a second coupling part, wherein the first and second coupling parts are configured to be deployed, respectively, on the first and second objects and the first coupling part includes: a body; at least one first coupling component engaged with the body and designed and configured to cooperate with at least one second coupling component located on the second coupling part so as to removable mechanically fix the first and second coupling parts together; and a hot-shoe assembly for communicating electrical signals between the first and second objects, the hot-shoe assembly including: a first hot-shoe connector designed and configured to be operationally engaged by a second hot-shoe connector having a first set of electrical contacts, the first hot-shoe connector including a second set of electrical contacts fixedly located on the body; a swappable component removably coupled to the body and including: a third set of electrical contacts for contactingly engaging the first set of electrical contacts when the first and second hot-shoe connectors are coupled with one another; and a fourth set of electrical contacts in electrical communications with the third set of electrical contacts and contacting the second set of electrical contacts; and a securing means removably securing the swappable passthrough insert to the body.

BRIEF DESCRIPTION OF THE DRAWINGS

For the purpose of illustration, the accompanying drawings show aspects of one or more embodiments made in accordance with the present disclosure. However, it should be understood that the scope of this disclosure is/are not limited to the precise arrangements and instrumentalities shown in the drawings, wherein.

DETAILED DESCRIPTION

Figure 1:
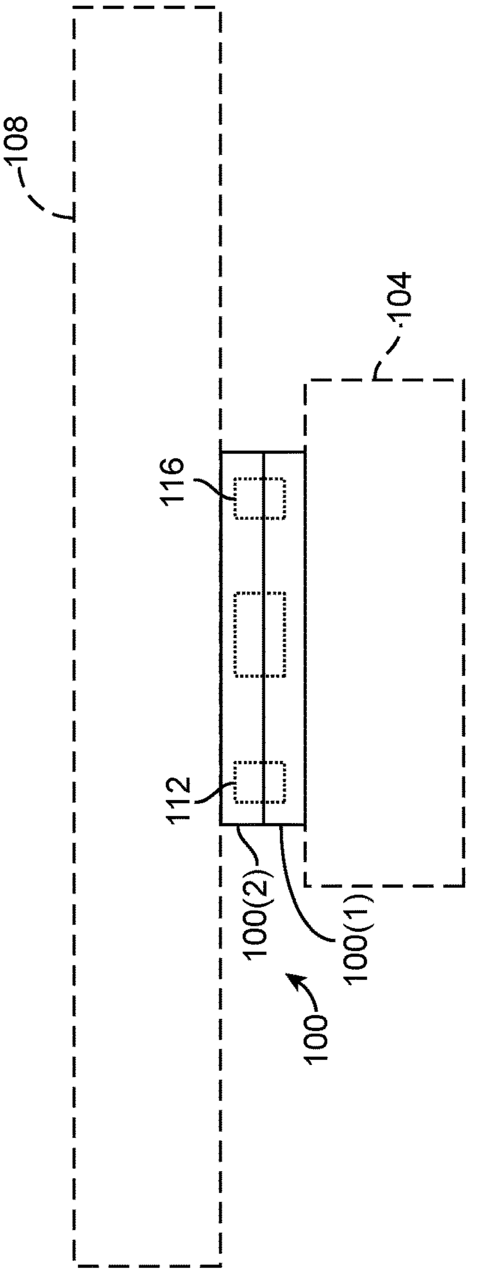
FIG. 1 is a high-level schematic diagram illustrating a coupling system of the present disclosure coupling together a pair of objects.

In the follow description, the terms "upper" and "lower", and any like positional terms, as well as "horizontal" and "vertical", and any like directional terms, applied to elements or features depicted in the figures, refer only to positions and directions relative to the relevant figures(s) and not positions and directions relative to any other frame of reference. Similarly, terms such as "first" and "second" used with descriptors of like elements of disclosed and claimed embodiments do not denote any particular order, preference, etc., of the elements, but rather are used only for convenience to identify that there are multiple instances of such elements.

Throughout the present disclosure, the term "about", when used with a corresponding numeric value, refers to ±20% of the numeric value, typically ±10% of the numeric value, often ±5% of the numeric value, and more often ±2% of the numeric value. In some embodiments, the term "about" can mean the numeric value itself.

Overview

In some aspects, the present disclosure is directed to coupling systems, including coupling systems that have repeatable highly precise positioning as between the coupling parts of the coupling systems and, therefore, the objects that the coupling systems couple to one another. In some embodiments, coupling systems of the present disclosure may be considered to be ruggedized, meaning that they include features that allow them to function in harsh environments, such as military field deployments, and, in some cases, allow them to be readily field serviceable so that parts prone to damage can be easily replaced by the field users.

Repeatable position precision is extremely important in certain applications. For example, a relatively small position and orientation (P&O) unit, which typically comprises a global positioning system (GPS) device and an inertial measurement unit (IN/U), can be attached to a pair of binoculars or other imaging device to create a targeting assembly that can be used to precisely identify a military target for neutralizing. Because of the relatively large distances between the targeting assembly and the target in this type of scenario, the optical axis of the image device and the local coordinate system of the P&O unit need to be precisely aligned with one another to provide the greatest targeting accuracy. As those skilled in the art can readily envision, even a fraction of a degree in misalignment in any one of the azimuth, pitch, and roll directions can result in several to tens of meters of error in the determined position of the target. Moreover, once a targeting assembly has been calibrated, it is important that the calibrated position of the P&O unit relative to the imaging device be repeatable each time the P&O unit is re-coupled to the imaging device. Other examples where high-precision and repeatable position for calibrated assemblies include, but are not limited to optical sighting scopes and laser sites for firearms and other armaments, among others.

In some aspects, the present disclosure is directed to hot-shoe couplings that include swappable components that users can readily change out for the same type of component or a different type of component, depending on the application at issue. Like some object-coupling systems of this disclosure, hot-shoe couplings of the present disclosure may also be highly ruggedized and readily field serviceable.

In some aspects, the present disclosure is directed to combinations that each include an object-coupling system of the present disclosure with a hot-shoe coupling, including a hot-shoe coupling made in accordance with the present disclosure, among others. These and other aspects are described in detail in the examples below.

Referring now to the drawings, FIG. 1 generally illustrates an example coupling system 100 that is made in accordance with various aspect of the present disclosure and is shown in the presence of two objects 104 and 108 that the coupling system is coupling together. As alluded to above, the two objects 104 and 108 can be any two objects that can be coupled together, such as P&O units and imaging devices, armaments and optical sights, armaments and laser sights, visible-light imaging devices and infrared imaging devices, among others, and any meaningful combinations of such objects. Generally, the coupling system 100 includes first and second coupling parts 100(1) and 100(2) having coupling features that allow them to be precisely couplable and re-couplable to one another reliably and repeatedly. As will be appreciated after reading this entire disclosure, each of the first and second coupling parts 100(1) and 100(2) may be a separate body relative to the corresponding one of the objects 104 and 108 or it may be integrated with the corresponding object so as to be a part thereof. When either of the first and second coupling parts 100(1) and 100(2) is a body separate from the corresponding object 104 and 108, it may be attached to that object in any suitable manner, such as mechanical fasteners, adhesive bonding, welding, and clamping, among others, and any meaningful combination thereof.

The coupling features of the first and second coupling parts 100(1) and 100(2) include a pivot connector set 112 and a locking connector set 116. The pivot connector set 112 includes at least one first head (not shown) located on one of the first and second coupling parts 100(1) and 100(2) and at least one corresponding first receiver (not shown) located on the other one of the first and second coupling parts. Each first receiver is designed and configured to initially receive the corresponding first head by insertion and then, with shear-type movement between the first and second coupling parts 100(1) and 100(2), capture the first head so that the first and second coupling parts cannot be separated from one another in a direction substantially normal to the direction of the shear-type movement.

The locking connector set 116 includes at least one second head (not shown) and at least one corresponding second receiver (not shown) located on one of the first and second coupling parts 100(1) and 100(2) and at least one corresponding second receiver (not shown) located on the other one of the first and second coupling parts. Each second receiver is designed and configured to initially receive the corresponding second head by insertion after the first head of the pivot connector set 112 has been inserted into and captured by the first receiver of the pivot connector set. As described below, the insertion of the second head into the second receiver of the locking connector set 116 may be achieved by pivoting the first and second coupling parts 100(1) and 100(2) relative to one another when the first head of the pivot connector set 112 is captured in the first receiver of the pivot connector set. The locking connector set 116 also includes one or more locking mechanisms (not shown) that lock the second head into the second receiver. Each locking mechanism may be any suitable mechanism, such as a mechanical mechanism, an electromechanical mechanism, or an electromagnetic mechanism, a magnetic mechanism, among others, or any suitable combination thereof.

The locking mechanism may operate on the second head or on the second receiver, or both, to provide the locking function. For example, embodiments described below include locking mechanisms that rotates the second head, which there is specially shaped in conjunction with the shape of the second receiver, to effect the locking. As another example, the second head may be fixed and the second receiver, or element thereof, may be rotated to achieve the locking effect. As a further example, a linearly sliding element may be provided to block at least a portion of the entrance to the second receiver so as to prevent the second head from moving out of the second receiver. These are but a few of many locking mechanisms that can be used. As illustrated below, in some embodiments, the locking mechanism may impart various forces into the coupling system 100 that cause the first and second coupling parts to precisely align with one another when the locking mechanism is fully engaged. In any event, the combined effect of each first head of the pivot connector set 112 being captured by the corresponding first receiver and each second head of the locking connector set 116 being locked into the corresponding second receiver firmly couples the first and second coupling parts 100(1) and 100(2) with one another.

Figure 2A:
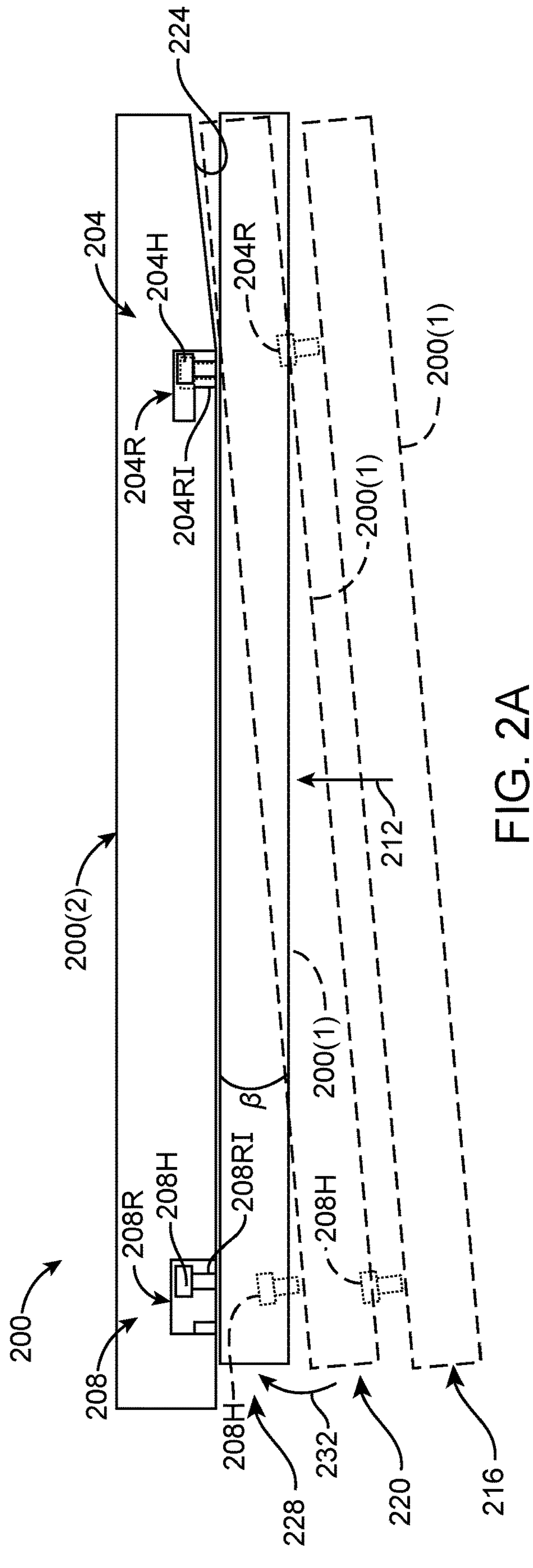
FIG. 2A is a cross-sectional view of an example coupling system made in accordance with aspects of this disclosure, showing the two coupling parts in partial engagement with one another and also, in phantom, the lower coupling part poised in two positions for initial engagement with the upper coupling part.
Figure 2B:
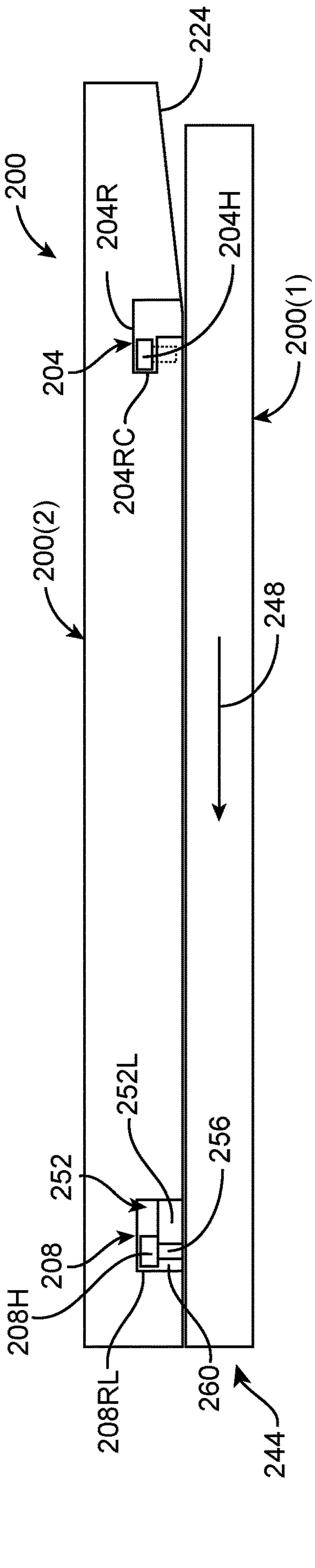
FIG. 2B is a cross-sectional view of the example coupling system of FIG. 2A, showing the two coupling parts in full engagement with one another.

FIGS. 2A and 2B show an embodiment 200 of the coupling system 100 of FIG. 1 and depicts example movements involved with initially engaging each first head, here, a first head 204H with the corresponding first receiver, here, a first receiver 208R, of a pivot connector set 204 and then causing the first receiver to capture the first head. In this example, the first head 204H is fixedly secured to a first coupling part 200(1) (corresponding to the first coupling part 100(1) of FIG. 1) and the receiver 204R is provided in a second coupling part 200(2) (corresponding to second coupling part 100(2) of FIG. 1. FIGS. 2A and 2B also depict example movements and features involved with initially engaging each second head, here, a second head 208H, with each second receiver, here, a second receiver 208R of a locking connector set 208, and then locking the second head 208H in the second receiver 208R.

Referring first to FIG. 2A, the initial engagement of the first head 204H with the first receiver 204R may proceed by first moving, as depicted by arrow 212, the first coupling part 200(1) from a first position 216 to a second position 220 whereat the first head is inserted into an insertion portion 204RI of the first receiver. As readily seen in FIG. 2A, in this example, the first head 204H is initially inserted into the first receiver 204R while the first and second coupling parts 200(1) and 200(2) are at an initial-engagement angle β, relative to one another. As will be readily appreciated from reading this entire disclosure, requiring the first and second parts 200(1) and 200(2) to be at a non-zero initial-engagement angle β when engaging the pivot connector set 204 has several benefits. In some embodiments, the initial-engagement angle is in a range greater than zero degrees to less than about 30°, or in a range of about 3° to about 30°, or in a range of about 5° to about 15°, among others. In this example, the second coupling part 200(2) includes a bevel 224 that allows for insertion of the first head 204H into the first receiver 204R at the non-zero initial-engagement angle β without the first and second coupling parts 200(1) and 200(2) interfering with one another.

Once the first head 204H is engaged with the insertion portion 204RI of the first receiver 204R, the first coupling part 200(1) is pivoted from the second position 220 to a third position 228, as depicted by movement arrow 232. In this example, this pivoting movement causes the second head 208H to be inserted into a head-insertion region 208RI of the second receiver 208R. FIG. 2A shows that once the second head 208H has been initially inserted into the second receiver 208R, the first head 204H is still in the initial-engagement region 204RI of the first receiver 204R. As seen in FIG. 2B, once the first coupling part 200(1) is in the third position 228 (FIG. 2A), it may be moved from that position to a fourth position 244 as depicted by movement arrow 248. In this example, moving the first coupling part 200(1) into the fourth position 244 moves the first head 204H into a head-capture region 204RC of the first receiver 204R and moves the second head 208H into a head-locking region 208RL of the second receiver 208R. Once the second head 208H is in the head-locking region 208RL, a locking mechanism 252 may be activated to lock the second head in the head-locking region. In this example, the locking mechanism 252 includes a movable locking member 252L that captures a shaft 256 that holds the second head 208H between it and a catch 260 so as to firmly capture the second head within the second receiver 208R.

Figure 2C:
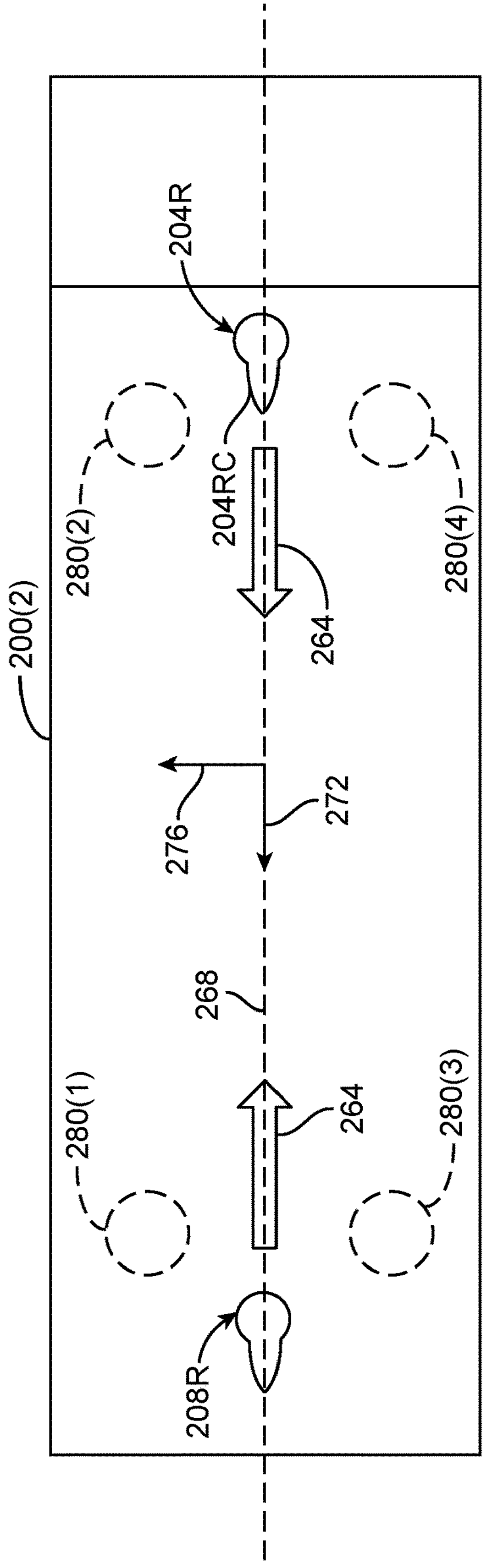
FIG. 2C is a reverse plan view of the coupling face of the upper coupling part of FIGS. 2A and 2B, illustrating that the coupling of the two couplable parts induced compression into the upper coupling part.

FIG. 2C illustrates that in the example coupling system 200 of FIGS. 2A and 2B the act of locking the second head 208H (FIGS. 2A and 2B) into the second receiver 208R using the locking mechanism 252 (FIG. 2B) induced compression into the second coupling part 200(2), as illustrated by force arrows 264. As can be readily envisioned, as the movable locking member 252L (FIG. 2B) is further engaged so as to push, toward the left in FIG. 2B, against the shaft 256 (FIG. 2B), the first head 204H (FIG. 2B) is biased to the left into firmer engagements with the head-capturing region 204RC of the first receiver 204R. These actions induce tension (not illustrated) into the first coupling part 200(1) and, correspondingly, the compression 264 into the second coupling part 200(2).

FIG. 2C also illustrates some example alignment features of the coupling system 200 of FIGS. 2A and 2B and that can also be used with other coupling systems made in accordance with aspects of the present disclosure, such as the coupling system 100 of FIG. 1. As is customary in some relevant arts, the positional relationship between the first and second coupling parts 200(1) and 200(2) (FIGS. 2A and 2B) is defined by three parameters, namely, azimuth, roll, and pitch, here depicted by a zero-azimuth line 268, a roll axis 272, and a pitch axis 276. In this example, perfect proper positional alignment exists between the first and second coupling parts 200(1) and 200(2) (FIGS. 2A and 2B) when both of the first and second coupling parts, which coupled together and fully locked, have zero deviation from the zero-azimuth line 268 and zero degrees of roll and pitch relative to, respectively, the roll axis 272 and the pitch axis 276. To achieve as perfect alignment as possible between the coupled first and second coupling parts 200(1) and 200(2) relative to the zero-azimuth axis 268, the each of the first and second receivers 204R and 208R and corresponding first and second heads 204H and 208H (FIGS. 2A and 2B) are precisely formed to force the first and second heads to center along the zero-azimuth axis as the locking mechanism 252 (FIG. 2B) is engaged.

Regarding controlling relative roll and relative pitch, each of the first and second coupling part 200(1) and 200(2) (FIGS. 2A and 2B) may include one or more datum surfaces. In FIG. 2C, the second coupling part 200(2) optionally has four datum surfaces 280(1) through 280(4), and the first coupling part 200(1) may have one or more corresponding datum surface, such as four datum surfaces (not shown) that may be identical to the four datum surfaces 280(1) through 280(4) shown. When provided, the datum surfaces, such as the datum surfaces 280(1) through 280(4) are precisely provided and formed so that when the datum surfaces of the first and second parts 200(1) and 200(2) are firmly engaged with one another, they provide a zero relative roll angle about the roll axis 272 and a zero relative pitch angle about the pitch axis 276. As exemplified by examples below, the first and second heads 204H and 208H and the first and second receivers 204R and 208R may be suitably designed and configured so that as the locking mechanism 252 (FIG. 2B) is increasingly engaged, the datum surfaces, such as the datum surfaces 280(1) through 280(4), of the first and second coupling parts 200(1) and 200(2) are forced into contact with one another with a controlled force. In some embodiments, other contact-force-controlling means can be provided, an example of which is described below in connection with FIG. 7B.

It is noted that a coupling system of the present disclosure is not limited to the particular contacting features illustrated herein for providing the repeatable precision alignment as between the two coupling parts. For example, in some embodiments any suitable configuration of an appropriately configures kinematic-coupling elements may be used to precisely and repeatably constrain both of the couple parts relative to one another. As those skilled in the art understand, such kinematic-coupling elements can be any suitable type including, but not limited to, a ball-and-planar-surface type, a ball-and-tetrahedral-socket type, a ball-and-groove (e.g., vee-groove) type, a type that is similar to any of the foregoing but is a non-ball type that includes a component having one or more curved surfaces that control points of contact, and a cone-and-vee type, among others. Those skilled in the art will readily understand how to implement kinematic couplings using any of a wide variety of kinematic-coupling elements.

Figure 3A:
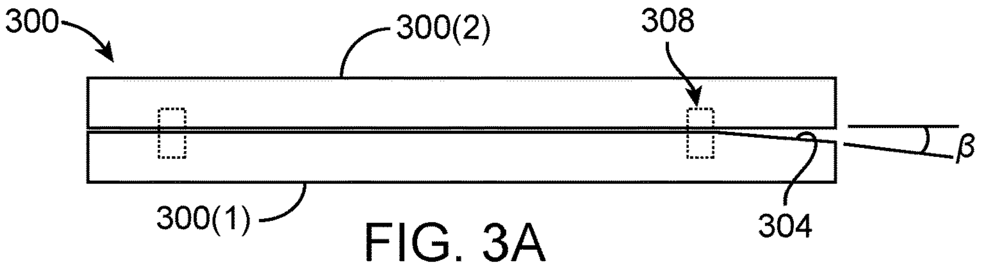
FIG. 3A is side view of an example coupling system that has an initial-engagement bevel on the lower coupling part, showing the two coupling parts fully engaged with one another.
Figure 3B:
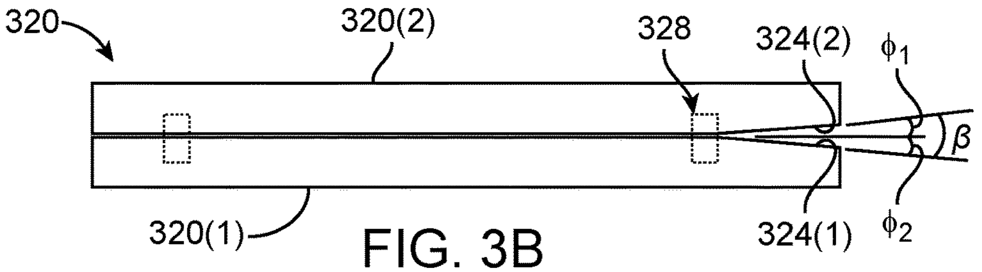
FIG. 3B is a side view of an example coupling system that has an initial-engagement bevel of each of the upper and lower coupling parts, showing the two coupling parts fully engaged with one another.
Figure 3C:
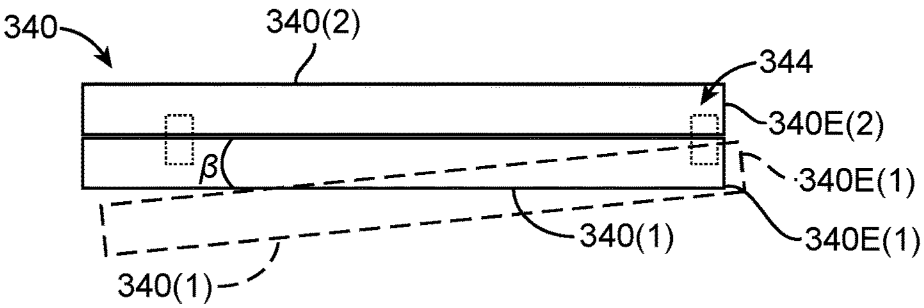
FIG. 3C is a side view of an example coupling system that does not include any initial-engagement bevel, showing the two coupling parts fully engaged with one another and also, in phantom, the lower coupling part poised for initial engagement with the upper coupling part.

Before proceeding with describing some general principles of operation of coupling systems of the present disclosure, FIGS. 3A through 3C show some alternative configurations of the first and second coupling parts for achieving the initial-engagement angle β between the first and second coupling parts. As seen in FIG. 2A, the second coupling part 200(2), i.e., the upper coupling part there, includes the bevel 224 that allows the first and second coupling parts 200(1) and 200(2) to be brought together at the initial-engagement angle β. In the example coupling system 300 of FIG. 3A, a bevel 304 is located proximate to the pivot connector set 308 on the lower coupling part 300(1) instead of on the upper coupling part 300(2), and this bevel is formed so as to provide the initial-engagement angle β. Other actions for coupling together and locking the lower and upper coupling parts 300(1) and 300(2) can be the same as or similar to the actions described above relative to coupling system 200 of FIGS. 2A through 2C and below relative to coupling system 100 of FIG. 1, among others.

As another example, in the example coupling system 320 of FIG. 3B each of the lower and upper coupling parts 320(1) and 320(2) is provided with a corresponding bevel 324(1) and 324(2) proximate to the pivot connector set 328 such that the sum of the two individual bevel angles $\phi_1$ and $\phi_2$, is equal to, or greater than, the design initial-engagement angle β. The individual bevel angles $\phi_1$ and $\phi_2$ can be equal or unequal to one another. Other actions for coupling together and locking the lower and upper coupling parts 320(1) and 320(2) can be the same as or similar to the actions described above relative to coupling system 200 of FIGS. 2A through 2C and below relative to coupling system 100 of FIG. 1, among others.

In some embodiments, the first and second coupling parts can be designed and configured so that neither of them needs a bevel for accommodating the initial-engagement angle. For example, as seen in the example coupling system 340 of FIG. 3C, the pivot connector set 344 is located close enough to ends 340E(1) and 340E(2) of the lower and upper coupling parts 340(1) and 340E(2) that the first and second coupling parts can be brought together at the initial-engagement angle β without any interference between the first and second coupling parts. Other actions for coupling together and locking the lower and upper coupling parts 340(1) and 340(2) can be the same as or similar to the actions described above relative to coupling system 200 of FIGS. 2A through 2C and below relative to coupling system 100 of FIG. 1, among others.

Figure 4:
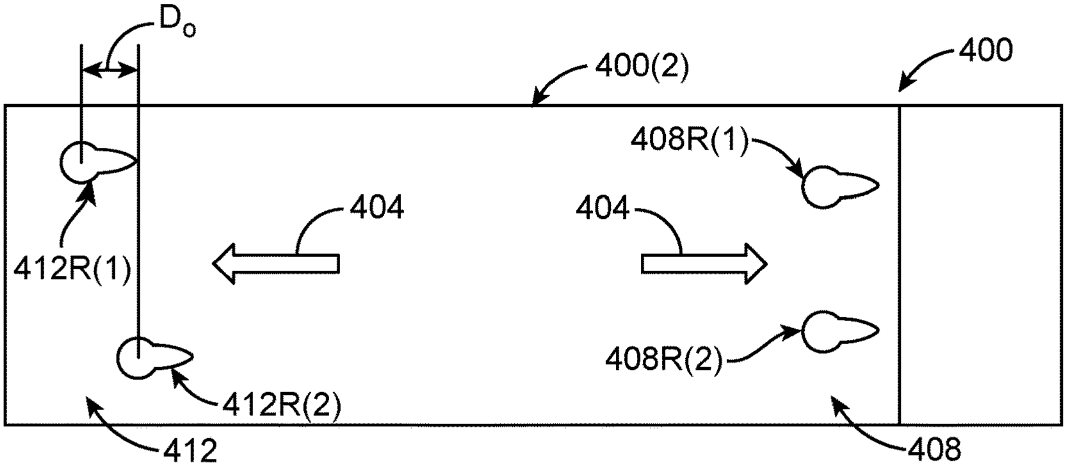
FIG. 4 is a reverse plan view of the coupling face of an alternative coupling part that works in tension within a coupling system of the present disclosure.

In the example coupling system 200 of FIGS. 2A-2C, the first receiver 204R is designed so that after initial engagement of the first head 204H therein, the first head is moved into the head-capture region 204RC of the first receiver by moving, as seen in FIG. 2B, the first coupling part 200(1) to the left relative to the second coupling part 200(2). Correspondingly, the second receiver 208R and the locking mechanism 252 are designed so that the movable locking member 252L biases the shaft 256 toward the left in FIG. 2B. As a result, the act of locking the first and second coupling parts 200(1) and 200(2) together induced compression (arrows 264, FIG. 2C) into the second coupling part. In contrast, the coupling system 400 of FIG. 4 is designed and configured so that when the first and second coupling parts (only the second coupling part 400(2) is shown) are locked together, tension is induced in the second coupling part, as indicated by force arrows 404. Correspondingly, locking the first and second coupling parts of the coupling system 400 of FIG. 4 together induces compression (not illustrated) into the first coupling part (not shown).

As can be readily envisioned by comparing FIGS. 2A and 4 with one another, tensile-force state is effected by reversing the direction in which a pair of first heads (not shown) of a pivot connector set 408 are engaged into corresponding first receivers 408R(1) and 408R(2), i.e., by moving the first coupling part (not shown) to the right (as opposed to the left as seen in FIG. 2B) and by reversing the direction in which the locking mechanisms (not shown) act against the shafts (not shown) of a locking connector set 412 when heads (not shown) of the locking connector set is engaged in corresponding receivers 412R(1) and 412R(2) of the locking connector set, here, by biasing the shafts to the right (as opposed to the left as seen in FIG. 2B). Other differences between the coupling system 400 of FIG. 4 from the coupling system of FIGS. 2A-2C include the number of the first receivers 408R(1) and 408R(2) (two versus one) (and correspondingly the number of first heads (not shown) and the number of second receivers 412R(1) and 412R(2) (also two versus one). Also of note in FIG. 4 is that that the second receivers 412R(1) and 412R(2) are longitudinally offset from one another by a distance, $D_O$. This is possible because the pivoting action used to engage the second heads (not shown) into the second receivers 412R(1) and 412R(2) generally involves the second heads being inserted into the second receivers substantially parallel to a direction normal to the sheet containing FIG. 4.

With some general principles of operation of the coupling system 100 of FIG. 1 having been described in the context of the embodiments of the coupling systems 200, 300, 320, 340, and 400 of FIGS. 2A-2C, 3A-3C, and 4, it is emphasized that the coupling systems 200, 300, 320, 340, and 400 are merely an example of many different coupling systems that can be made in accordance with such general principles. Referring again to FIG. 1, and also to other figures as indicated, FIG. 1 does not explicitly depict which of the first and second coupling parts 100(1) and 100(2) that the first and second heads and the first and second receivers are located on. This is so because while the first and second heads 204H and 208H of the coupling system 200 of FIGS. 2A and 2B are both located on the first coupling part 200(1) and the corresponding first and second receivers 204R and 208R are both located on the second coupling part 200(2), this need not be so, as the locations of these components can be swapped. For example, the first and second heads 204H and 208H may alternatively both be located on the second coupling part 200(2), with the first and second receivers 204R and 208R being located on the first coupling part 200(1). As another example, the first head 204H may be located on the first coupling part 200(1) while the second head 208H is located on the second coupling part 200(2), with the corresponding first and second receivers 204R and 208R located, respectively, on the second coupling part and the first coupling part. Fundamentally, which components of the pivot and locking connector sets 204 and 208 (i.e., the first and second heads 204H and 208H and first and second receivers 204R and 208R (FIGS. 2A and 2B)) are located on which ones of the first and second coupling parts (200(1) and 200(2) of FIGS. 2A and 2B) does not matter from a functionality standpoint but may vary to suit a particular design and/or application.

The term "head" as it is used in the context of the first and second heads of, respectively, the pivot and locking connector sets 112 and 116 (FIG. 1) covers any structure that performs the requisite function of being captured/locked within a corresponding receiver, regardless of whether its physical appearance resembles a traditional head of a mechanical component, such as a bolt, screw, rivet, etc., or not. Examples of non-traditional heads that each of the first and second heads of the pivot and locking connector sets 112 and 116 include, but are not limited to the cross pieces of a structures shaped like a staple (mechanical fastener), knurled portions of a straight shaft (e.g., wherein the knurled portions are gripped by gripping components of receivers), slotted portions of shafts or bars (e.g., wherein the slots are engaged by corresponding capturing members of receivers), apertured portions of shafts or bars (e.g., wherein the apertures are engaged by corresponding capturing members of receivers), and bodies that are magnetic or contain or otherwise hold magnets (e.g., where attracted by or to other bodies that are part of receivers), among others. Those skilled in the art will readily understand that the possible configuration for a head of the pivot and locking connector sets 112 and 116 (FIG. 1) are so varied that a functional meaning is needed.

The nature and character of each second head of the locking connector set 116 is dependent upon, for example, the configuration and type of the locking mechanism used. Similarly, the nature and character of each first head of the pivot connector set 112 is dependent upon, for example, the configuration of the head-capture region of the first receiver (see, e.g., head-capture region 204RC of the first receiver 204R of FIGS. 2A and 2B. It is further noted that while the first and second heads 204H and 208H of FIGS. 2A and 2B are shown as having only horizontal and vertical surfaces, other embodiments may have non-vertical and non-horizontal surface and/or specially contoured surfaces for achieving the desired result(s), such as controlling forces induced into the coupling system 100 upon locking the first and second coupling members 100(1) and 100(2) together and/or forcing the first and second coupling members into proper alignment with one another.

Referring still to FIG. 1, the coupling system 100 may optionally include one or more electrical and/or optical connections, singly and collectively represented at hot-shoe coupling 120. For ease of description, the term "hot shoe" means any one or more electrical and/or optical connections that are effected by coupling the first and second coupling parts with one another to couple together the hot-shoe connectors (not shown) of the hot-shoe coupling. Examples of such connections include electrical connections for transmitting electrical power between the first and second objects 104 and 108, electrical connections for transmitting electrical signals, e.g., data signals, between the first and second objects, and optical connections for transmitting optical signals, e.g., data signals, between the first and second objects. Electrical and/or optical signals may be in a single direction or in both directions between the two objects 104 and 108. The character of the signals and nature(s) of the electrical and/or optical connections may be in accordance with any one or more suitable standards, including military standards, commercial standards, and proprietary standards. Those skilled in the art will be familiar with the standard(s) that apply to thee applications for which they are designing each instantiation of the coupling system 100. Example hot shoes are described below and shown in FIGS. 6 through 10C.

DETAILED EXAMPLES

Following are specific instantiations of coupling systems and hot shoes that include various features described above. Those skilled in the art will readily understand that these specific instantiations are not intended to be limiting in any way. On the contrary, they are merely examples of how the disclosed features can be embodied in functioning, fieldable devices. Those skilled in the art will readily be able to use these instantiations and their understanding of the underlying features and functionalities from the descriptions above, coupled with ordinary skill in the art, to create many other instantiations without undue experimentation.

Figure 5A:
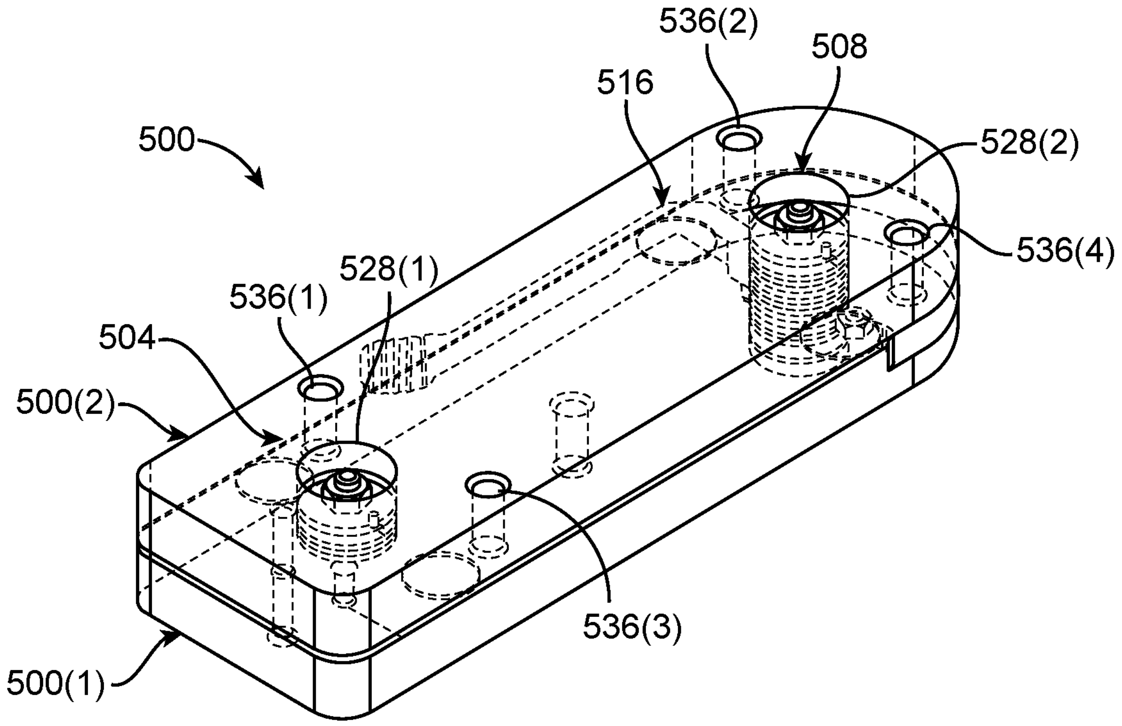
FIG. 5A is a partially transparent isometric view of another example coupling system that includes a lever-type locking mechanism.
Figure 5B:
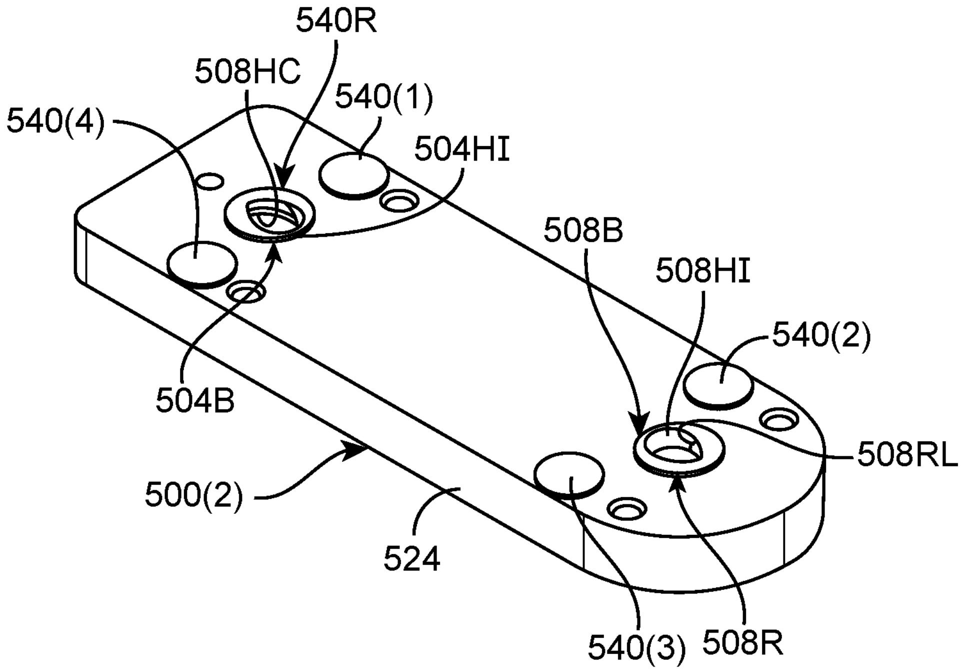
FIG. 5B is a reduced-size isometric view of the coupling face of the upper coupling part of FIG. 5A.
Figure 5C:
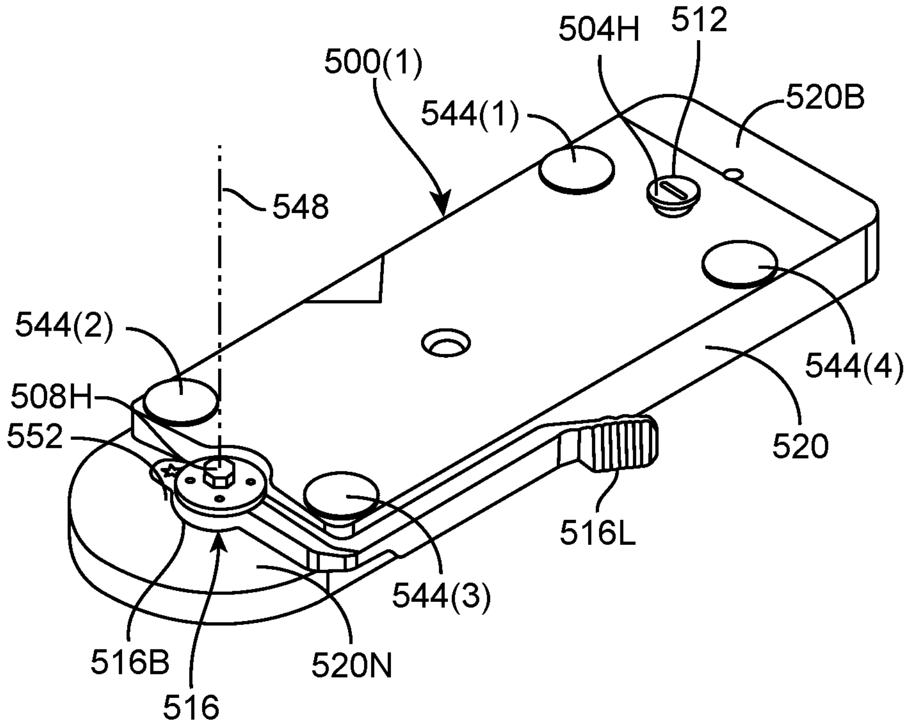
FIG. 5C is a reduced-size isometric view of the coupling face of the lower coupling part of FIG. 5A.

FIGS. 5A through 5C illustrate an example coupling system 500 that includes first and second coupling parts 500(1) and 500(2) designed and configured to be coupled to one another with highly repeatable precision using the non-zero initial-engagement angle approach described above in detail. Like the coupling system 100 of FIG. 1 described above, the coupling system 500 of FIGS. 5A through 5C is designed and configured to couple-together first and second objects (not shown), with the first coupling part 500(1) being designed and configured to be fixedly secured to the first object and the second coupling part 500(2) designed and configure to be fixedly secured to the second object.

The coupling system 500 includes a pivot connector set 504 and a locking connector set 508 that have the functionalities described above in connection with FIG. 1. In this embodiment, the pivot connector set includes a head 504H and a corresponding receiver 504R, and the locking connector set 508 includes a head 508H and a corresponding receiver 508R. The head 504H of the pivoting connector set 504 is part of a screw 512 that is threadedly engaged with the first coupling part 500(1), and the head 508H of the locking connector set 508 is part of a locking mechanism 516. In this embodiment, the first coupling part 500(1) comprises a plate 520, and the locking mechanism 516 is pivotably secured to the first coupling part 500(1). Each of the receivers 504R and 508R are located on the second coupling part 500(2) and include, respectively, an initial-engagement region 504RI, 508RI and a corresponding head-capture region 504RC or head-locking region 508LC that initially receive and then capture or lock the respective heads 504H and 508H during the coupling operations. Each of the receivers 504R and 508R in this embodiment is formed in a body 504B, 508B from a plate 524 that comprises the second coupling part 500(2) and is secured in a corresponding opening 528(1) and 528(2) in the plate using a threaded connection 532(1) and 532(2). In this example, the plate 524 also includes through-holes 536(1) through 536(4) for fixedly securing the second coupling part 500(2) to a corresponding object.

It is noted that in this embodiment the initial-engagement regions 504RI and 508RI are located relative to the corresponding head-capture/head-locking regions 504RC and 508RL so that when the heads 504H and 508H are located in the head-capture/head-locking regions and the first and second coupling parts 500(1) and 500(2) are fully coupled together (as described below), tension is imparted into the second coupling part between the receivers 504R and 508R and compression in imparted into the first coupling part between the heads 504H and 508H. These forces and the shapes of the heads 504H and 508H and the shapes of the head-capture/head-locking regions 504RC and 508RL precisely maintain a zero relative azimuth angle between the first and second coupling parts 500(1) and 500(2). Each of the first and second coupling parts 500(1) and 500(2) includes, respectively, four datum surfaces 540(1) through 540(4) and 544(1) through 544(4) that firmly contact one another when the first and second coupling parts are fully coupled so as to provide precise control over the relative roll and pitch angles as between the first and second coupling parts.

As mentioned above, the locking mechanism 516 is pivotably secured to the plate 520 of the first coupling part 500(1) and includes the head 508H of the locking connector set 508. As seen in FIG. 5C, the locking mechanism 516 includes a base 516B and a throw lever 516L fixedly secured to the base. The base 516B is pivotably secured to the plate 520, for example as discussed below relative to FIGS. 7A and 7B. The head 508H is fixedly secured to the base 516B and has an asymmetrical shape in a plane transverse to the pivot axis 548 of the locking mechanism 516. The asymmetrical shape in due to a capture lobe 552 that becomes captured/locked in the head-locking region 508RL of the mating receiver 508R when a user (not shown) moves the throw lever 516L to the locked position 556 shown in FIG. 5C. When the throw lever 516L is in an unlocked position (not shown), the capture lobe 552 is out of the head-capture region 508RC, allowing the head 508H to move freely into and out of the initial-engagement region 508RI of the receiver 508R. In this embodiment, the plate 520 includes a notched region 520N that provide space for movement of the throw lever 516L, as well as an initial-engagement bevel 520B to allow for initially engaging the first and second coupling parts 500(1) and 500(2) with one another at a non-zero initial-engagement angle (see, e.g., FIG. 2A, at 3) via the pivot connector set 514. Further details of the locking mechanism 516 and the coupling of the first and second coupling parts 500(1) and 500(2) with one another are described below in connection with a similar coupling system 600 (FIGS. 6A through 6C) that is generally identical to the coupling system 500 of FIGS. 5A through 5C, except that it includes a hot-shoe coupling 604.

Figure 6A:
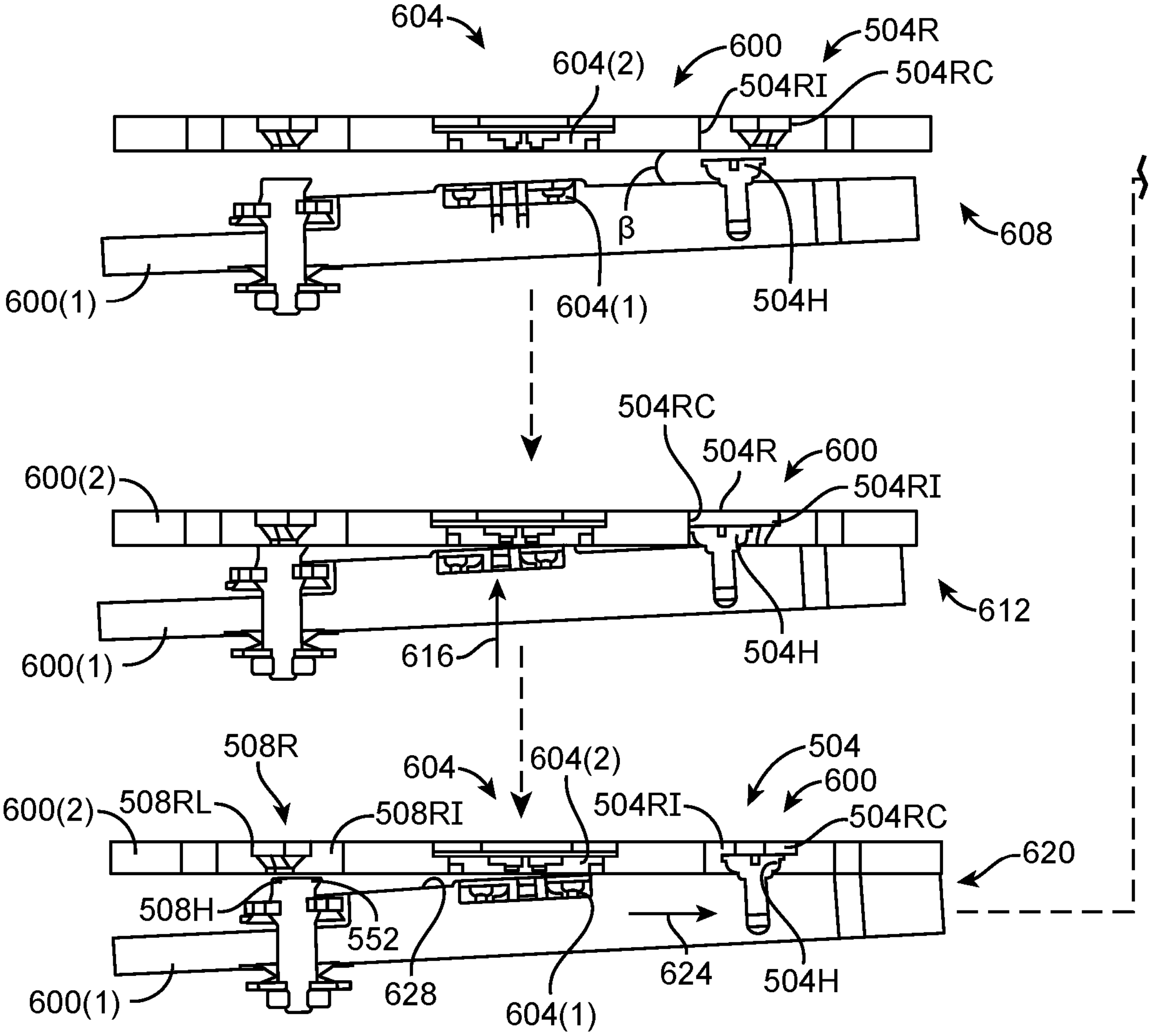
FIG. 6A is a sequence diagram showing stages of coupling a first coupling part with a second coupling part of another coupling system made in accordance with aspects of the present disclosure.
Figure 6A:
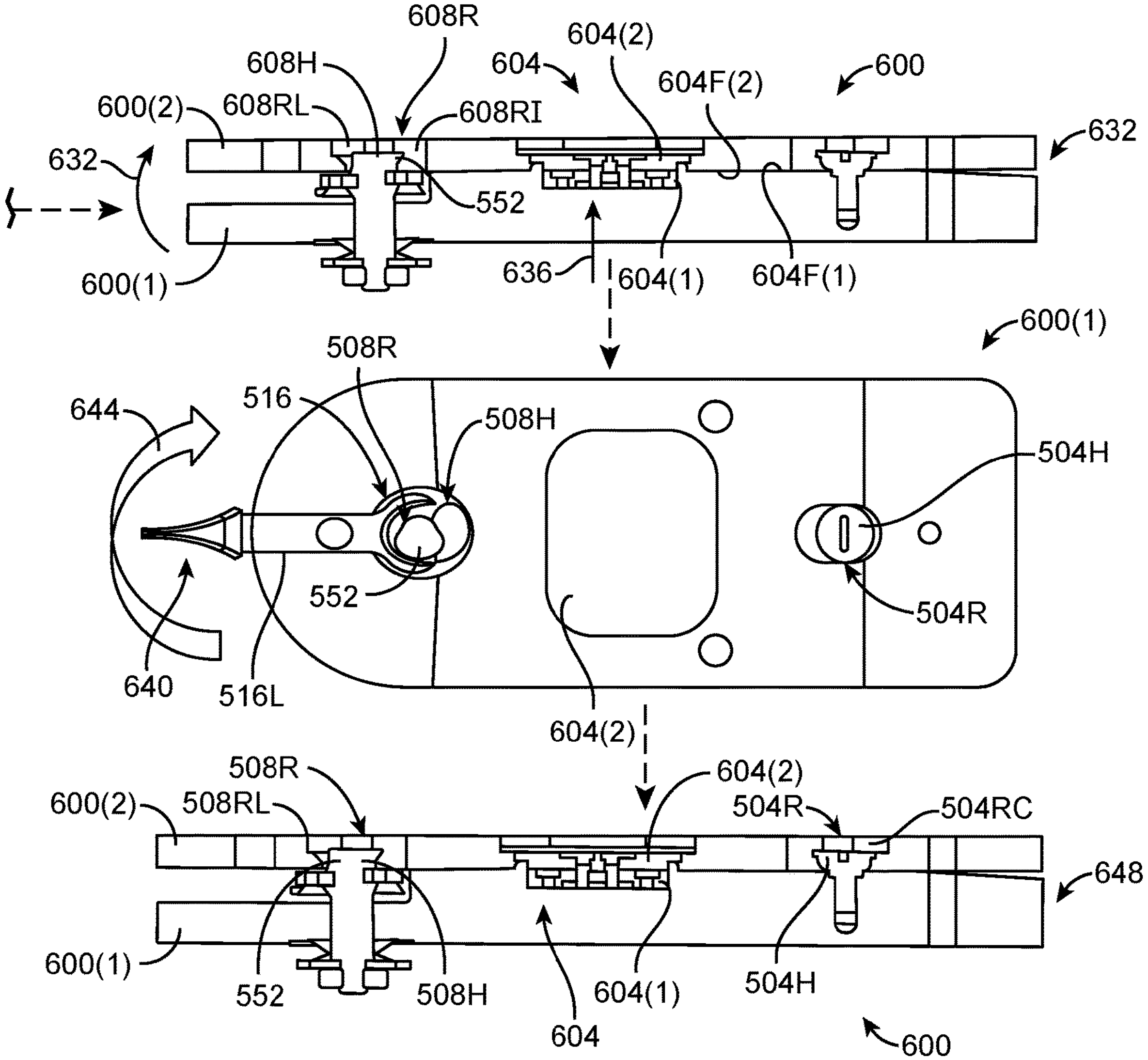

Referring now to FIG. 6A, this figure shows the first and second coupling parts 600(1) and 600(2) of the coupling system 600 during various stages of the operations of coupling and locking them together with one another. As mentioned immediately above, the coupling system 600 of FIG. 6A is largely identical to the coupling system 500 of FIGS. 5A through 5C. Consequently, elements of the coupling system 600 that are the same as corresponding elements of the coupling system 500 are labeled with the same element identifiers. Generally, and as also mentioned above, the difference between the coupling system 600 of FIG. 6A and the coupling system 500 of FIGS. 5A through 5C is that the coupling system 600 has a hot-shoe coupling 604, which comprises a first hot-shoe connector 604(1) on the first coupling part 600(1) and a second hot-shoe connector 604 (2) on the second coupling part 600(2).

Starting at the image in the upper left of FIG. 6A, the first and second coupling parts 600(1) and 600(2) are shown in a first relative position 608 wherein the head 504H of the pivot connector set 504 is aligned with the initial-engagement region 504RI of the corresponding receiver 504R and the first coupling part 600(1) is disposed at an initial-engagement angle β relative to the second coupling part 500(2). The middle image on the lefthand side of FIG. 6A shows a second relative position 612 between the first and second coupling parts 600(1) and 600(2) wherein the head 504H of the pivot connector set 504 is fully engaged into the initial-engagement region 504RI of the receiver 504R after a user (not shown) has moved the first coupling part 600(1) in the direction of arrow 616. Note how the initial-engagement bevel 520B is in full contact with the bottom of the second coupling part and allows the head 504H to be fully engaged with the initial-engagement region 504RI while the initial-engagement angle is maintained.

The bottom image on the lefthand side of FIG. 6A shows a relative position 620 between the first and second coupling parts 600(1) and 600(2) with the head 504H of the pivot connector set 504 fully engaged within the head-capture region 504RC of the receiver 504R. This third relative position 620 is achieved by the user sliding the first coupling part 600(1) relative to the second coupling part 600(2) along the contact interface between the engagement-angle bevel 520B and the second coupling part in the direction of arrow 624.

Relative positions 612 and 620 illustrate an important feature of the coupling system 600 relative to the hot-shoe coupling 604. As can be seen in the images showing the second and third relative positions 612 and 620, the first hot-shoe connector 604(1), which sits proud of the adjacent face 628 of the first coupling part 600(1) that confronts the second coupling part 600(2), does not contact the second hot-shoe connector 604(2) during the operation of sliding the first coupling part along the second coupling part in the direction of arrow 624. Consequently, there is no wear and tear on component of the first and second hot-shoe connectors 604(1) and 604(2), such as electrical contacts, during this stage of the coupling operations. This is in directly contrast to most conventional hot shoes in which electrical contact pins on one hot-shoe connector are swiped across parts of a second hot-shoe connector as two objects are coupled together via a conventional coupler. Such conventional swiping action causes electrical contact pins to break or otherwise fail, which leads to equipment malfunctioning. A couple system of the present disclosure, such as the coupling system of FIG. 6A avoids that type of hot-shoe failure and the attendant equipment failures.

The image in the upper right of FIG. 6A shows the first and second coupling parts 600(1) and 600(2) in a fourth relative position 632 in which the head 508H of the locking connector set 508 is fully engaged within the initial-engagement region 508RI of the corresponding receiver 508R. The fourth relative position 632 is achieved from the third relative position 620 by the user pivoting the first coupling part 600(1) in the direction indicated by arrow 636. Note that the capture lobe 552 of the head 508H is on the righthand side of the head 508H upon initial engagement of the head 508H with the initial-engagement region 508RI of the receiver 508R.

Relative positions 620 and 632 illustrate another important feature of the coupling system 600 concerning the hot-shoe coupling 604. This feature is that the first and second hot-shoe connectors 604(1) and 604(2) are engaged with one another in a direction, indicated by arrow 636 that is nearly perpendicular to the confronting faces 604F(1) and 604F(2) of the first and second hot-shoe connectors. This allows for the use of robust components, such as straight-in-type electrical contacts and/or straight-in-type optical connectors, in the hot-shoe coupling 604.

The middle image on the righthand side of FIG. 6A illustrates the throw-lever 516L of the locking mechanism 516 in a partially locked position 640. As seen there, when the throw lever 516L is in the partially locked position 640, the capture lobe 552 has been pivoted about 90° clockwise from its position in the upper righthand image of FIG. 6A. The locking direction of the locking mechanism 516 is illustrated by the arrow 644 in the middle righthand image of FIG. 6A. In the partially locked position 640, the capture lobe 552 is partially captured in the head-capture region 508RC of the receiver 508.

The image at the bottom right of FIG. 6A shows the first coupling part 600(1) in a fully locked state 648 with the second coupling part 600(2). In this fully locked state 648, the user has fully thrown the throw lever 516L so as to pivot the capture lobe 552 about 180° clockwise from its position in the upper righthand image of FIG. 6A and about 90° clockwise from its position in the middle righthand image of FIG. 6A. When the coupling system 600 is in the fully locked state 648, as further discussed below, the capture-lobe 552 firmly engages the head-capture region 508RC of the receiver 508R so as to impart various forces into the second coupling part 600(2) that precisely align the first coupling part 600(1) with the second coupling part.

Figure 6B:
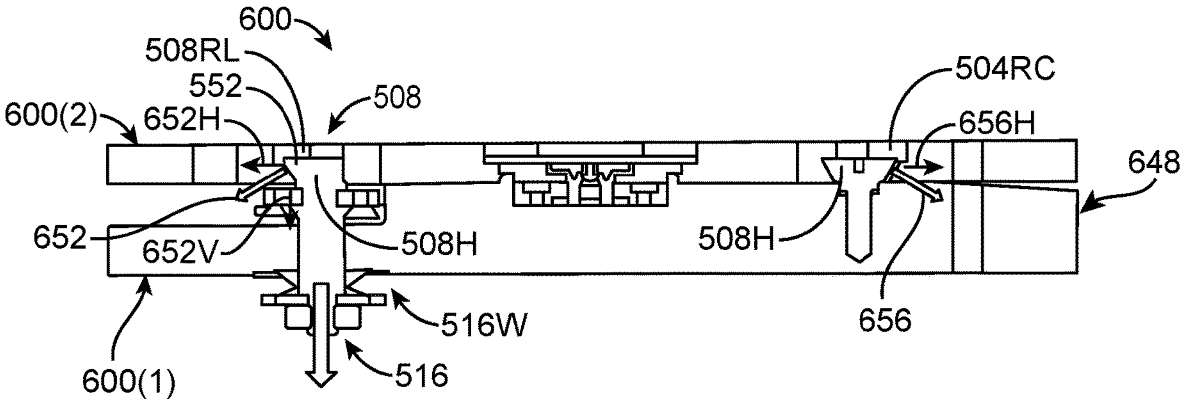
FIG. 6B is an enlarged cross-sectional view of the coupling system of FIG. 6A when the first coupling part is fully engaged with and locked to the second coupling part.
Figure 6C:
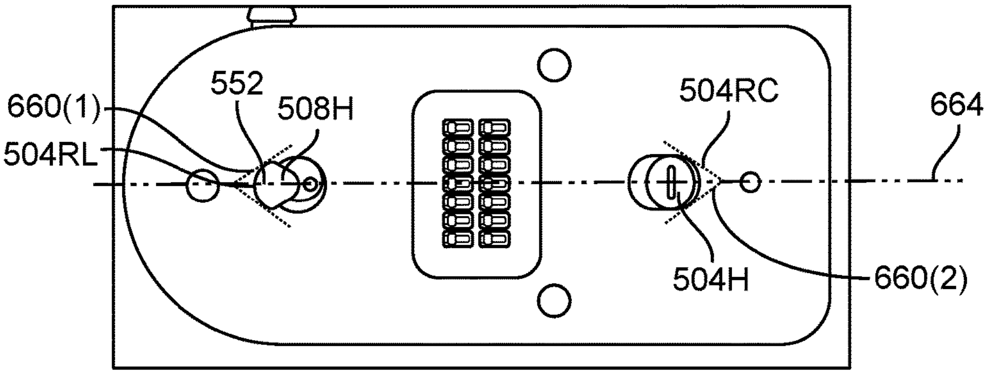
FIG. 6C is an enlarged plan view of the backside of the second coupling part of the coupling system of FIG. 6A when the first coupling part is fully engage with and locked to the second coupling part, showing self-aligning features that assist in providing highly repeatable azimuthal relative alignment as between the first and second coupling parts.

FIG. 6B contains an enlarged view of the coupling system 600 in the fully locked state 648 depicted in the lower righthand image in FIG. 6A. Referring now to FIG. 6B, and also to FIG. 6C as indicated, it is more clearly seen that the head-capture/locking regions 504RH and 508RL and the corresponding heads 504H and 508H (particularly the capture lobe 552 of the head 508H) are particularly shaped and located so that when the user fully locks the first coupling part 600(1) to the second coupling part 600(2), the heads impart forces 652 and 656 into the second coupling part. These forces 652 and 656, and the shapes of the corresponding respective contact surfaces, A) cause the first coupling part 600(1) to firmly draw the second coupling part 600(2) into contact with it so as to precisely control relative roll and relative pitch (see FIG. 2C and accompanying description) as between the first and second coupling part and, as best illustrated by FIG. 6C) cause the capture lobe 552 of head 508H and the head 504H to perfectly center themselves within the corresponding head-locking/-capture regions 508RL and 504RC so as to precisely control the relative azimuth angle (see FIG. 2C and accompanying description). As seen in FIG. 2C, each of the capture lobe 552, head 504H, head-locking region 508RL, and head-capture region 504RC are specifically shaped so that the capture lobe and head 504H center themselves in virtual V-shaped slots 660(1) and 660(2) in response to the horizontal components 652H and 656H of the forces 652 and 656, respectively, of FIG. 6B. In this embodiment, the apexes of the virtual V-shaped slots 660(1) and 660(2) are precisely centered on the zero-relative-azimuth line 664. FIG. 6B also shows that in this embodiment the locking mechanism 516 includes a force-control feature, here, a Belleville washer arrangement 516W, that limits the magnitude of the vertical component 652V of the force 652 applied by the capture lobe 552 to the head-locking region 508RL of the locking connector set 508. The force-control feature is used to accommodate positional error between the two opposing head-locking/-capture regions 508RL and 504RC due to manufacturing tolerances and ensures that the vertical component 652V of the force 652 does not fall below a certain minimum magnitude.

Figure 7:
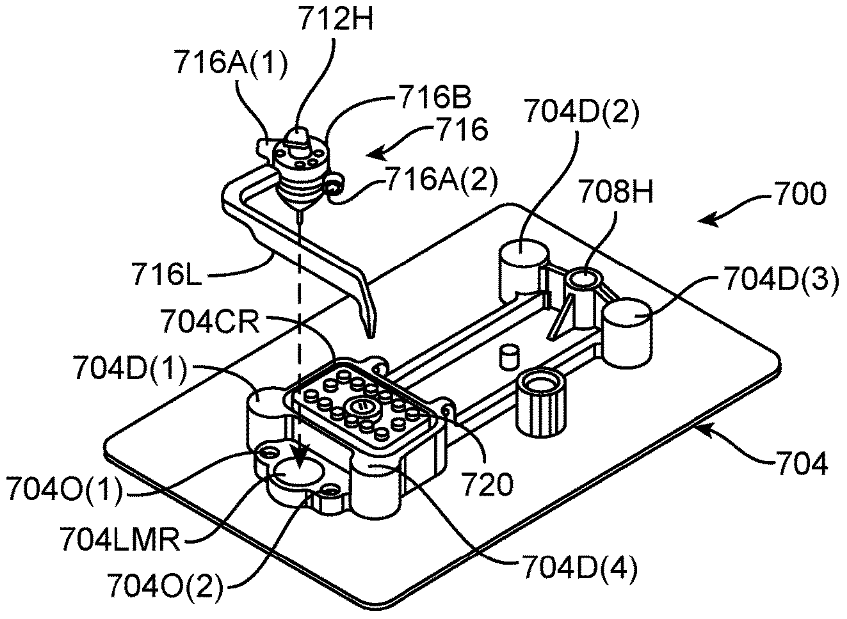
FIG. 7 is a partially exploded perspective view of another lever-type locking mechanism that can be used with a coupling system of the present disclosure.

FIG. 7 shows one coupling part 700 of a mating pair (not shown) of coupling parts of a another example coupling system made in accordance with the present disclosure. In this example, the coupling part 700 includes a multi-faceted structure 704, which may be directly integrated with an object (not shown) that is desired to be coupled together with another object (not shown) using a coupling system of the present disclosure. In this example, the coupling part 700 includes a first head 708H of a pivot connector set (the mating receiver is not shown) and a second head 712H of a locking connector set (the mating receiver is not shown). Like the second head 508H of FIGS. 5A and 5B, the second head 712H of FIG. 7 is fixedly secured to a base 716B of a locking mechanism 716 that also includes a throw lever 716L. The locking mechanism 716 has the benefit over the locking mechanism 516 of being readily field replaceable by virtue of being secured to the multi-faceted structure 704 using two screws (not shown) that pass through apertures 716A(1) and 716A(2) and threadedly engage corresponding threaded openings 704O(1) and 705O(2) in the multifaceted structure when the locking mechanism is properly seated in a suitable locking-mechanism receptacle 704LMR. In this example, the multifaceted structure 704 also include four datum surfaces 704D(1) through 704D(4) for controlling relative roll and relative pitch in the same manner as discussed above. The coupling part 700 also includes a hot-shoe connector 720 seated in a corresponding connector receptacle 704CR and secured therein with a screw. Other features of a the hot-shoe connector 720 of FIG. 7 are described below relative to the similar the first hot-shoe connector 800(1) of FIG. 8A.

Figure 8A:
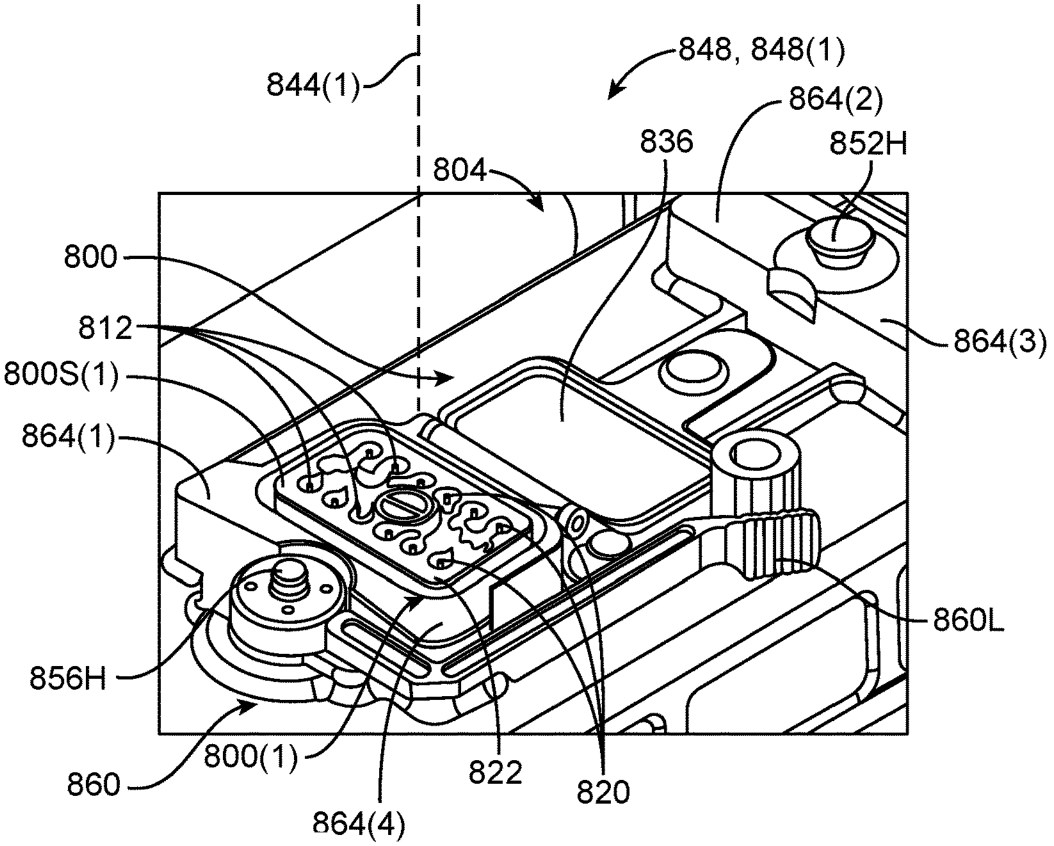
FIG. 8A is a perspective partial view of a first object that includes an integrated first hot-shoe connector of a hot-shoe coupling of the present disclosure and that further includes a coupling system of the present disclosure.
Figure 8B:
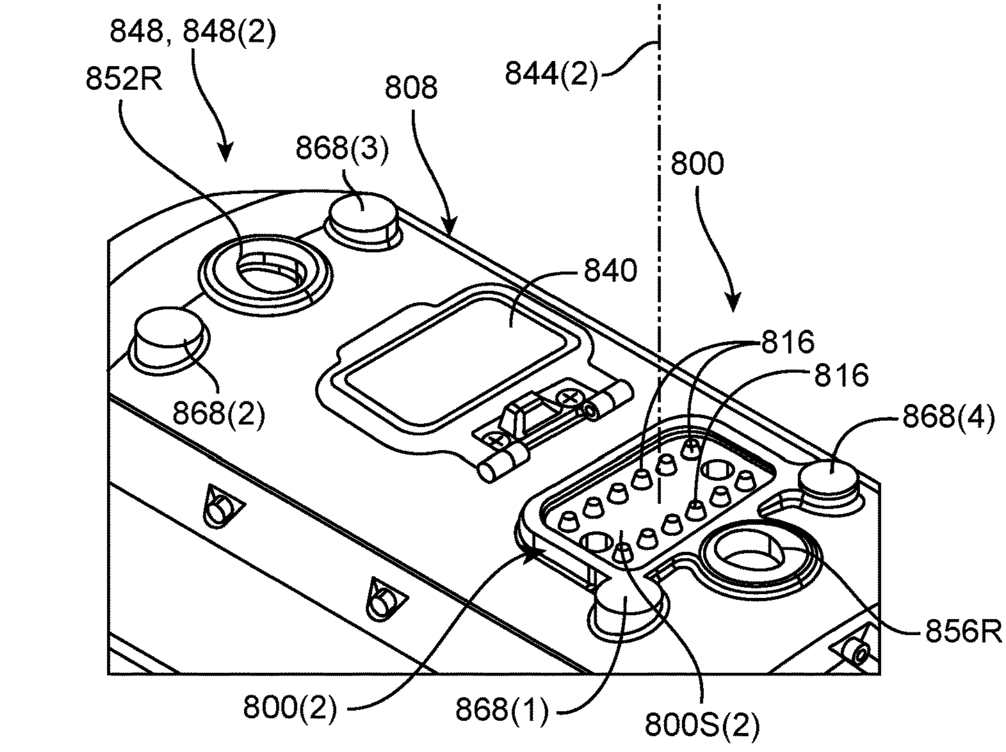
FIG. 8B is a perspective partial view of second object designed and configured to be coupled to the first object of FIG. 8A via the coupling system, the second object including an integrated second hot-shoe connector that couples to the first hot-shoe connector of FIG. 8A.

FIGS. 8A and 8B illustrate an example hot-shoe coupling 800 made in accordance with aspects of the present disclosure, wherein the hot-shoe coupling includes a first hot-shoe connector 800(1) (FIG. 8A) and a second hot-shoe connector 800(2). In this example, the first hot-shoe connector 800(1) is integrated with a first object 804 and the second hot-shoe connector 800(2) is integrated with a second object 808. In an illustrative and nonlimiting example, the first object 804 may be an imaging device and the second object 808 may be a P&O unit that is designed to communicate with the imaging device via the hot-shoe coupling 800, which in this example includes 12 sets of mating electrical contacts that in this example include 12 pogo-pin contacts 812 (FIG. 8A; only a few labeled to avoid clutter) and 12 pin-pushing contacts 816 (FIG. 8B; only a few labeled to avoid clutter). The pogo-pin contacts 812 are present in 12 corresponding receptacles 820 having a frustoconical shape, and the corresponding pin-pushing contacts 816 have a similar frustoconical shape. When the first and second hot-shoe components 800(1) and 800(2) are properly engaged with one another, the pin-pushing contacts 816 are conformally engaged with the like-shaped receptacles 820.

In this example, the first hot-shoe connector 800(1) includes a swappable component 822 that is seated in a suitable connector receptacle 824 on the first object 804 and secured therein, here, by a threaded fastener 828, although other types of securing means, such as friction fit, snap fit, interference fit, etc., can be used as desired. The swappable nature of the swappable component 822 makes the hot-shoe coupling 800 highly serviceable, even when being used in the field. The swappable component 822 includes the pogo-pin contacts 812, which are more prone to damage during use than the pin-pushing contacts 816 on the second object. Consequently, it is desirable to be able to swap in a replacement swappable component (not shown) when any pogo-pin contact 812, and/or any other part of the swappable component 822, is/are damaged to the extent that the hot-shoe coupling 800 does not work properly in order to continue using the first and second objects 804 and 808 together. In this example, all that is needed to make such a swap is for a user to have a suitable screwdriver for the threaded fastener 828 and an undamaged replacement first hot-shoe connector.

Figure 8C:
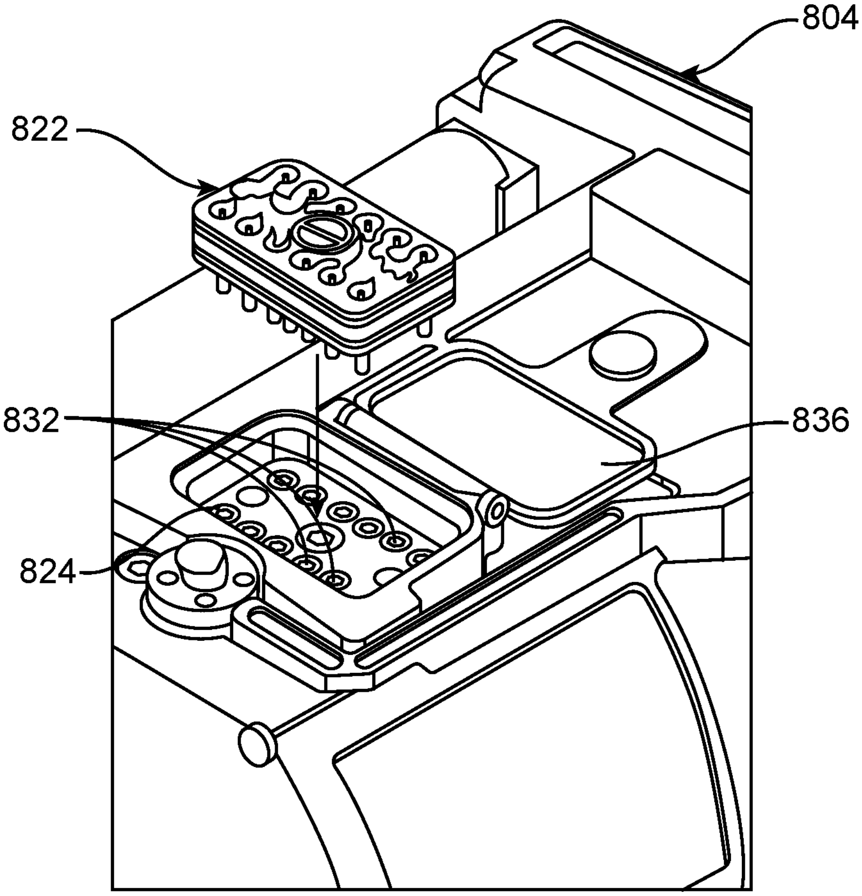
FIG. 8C a perspective partially exploded partial view of the first hot-shoe connector of FIG. 8A in the process of being engaged with the connector receptacle of the first object.

FIG. 8C shows a view of the of the first object 804 during a process of installing the swappable component 822 into the connector receptacle 824 on the first object. As seen in FIG. 8C, the connector receptacle 824 includes 12 electrical receptacles 824R that receive corresponding fixed-pin contacts 832 on the swappable component 822. In this example, the swappable component 822 is a "straight-through" type component, with there being a one-to-one relationship between the pogo-pin contacts 812 on one side of the swappable component and the fixed-pin contacts 832 on the other side of the swappable component. While FIGS. 8A through 8C illustrate such a straight-through configuration, other embodiments of the swappable component 822 may have a different relationship between the electrical contacts on the differing sides. As an example, electrical-contact configurations on the first and second objects 804 and 808 may be different from one another, and the swappable component may be configured to interface between the two differing configurations. As a simple example, the electrical-contact configuration on the first object 804 may have 16 electrical contacts, while the electrical-contact configuration on the second object 808 has 12 electrical contacts that do not align with any 12 electrical contacts on the first object. In this case, a different version of the swappable component 812 may have the same 12-pin configuration of the pogo-pin contact 812 on its second-hot-shoe-connector engaging side but have a different arrangement (e.g., differing in spacing and/or location) of at least 12 fixed-pin contacts (not shown) (or a full set of 16) on its side that engages the electrical receptacles of the first object. Internal electrical connections (not shown) between electrical contacts on the opposite sides of the modified version of the swappable component would then be as needed to connect ("map") the electrical contacts as needed to suit the particular requirements of both the first and second objects 804 and 808. As those skilled in the art will readily appreciated, many other possibilities exist relative to providing swappable first hot-shoe connectors having differing contact configurations on opposite sides. In the example shown, each of the first and second hot-shoe connectors 800(1) and 800(2) has a corresponding watertight closure 836 (FIGS. 8A and 8C) and 840 (FIG. 8B) that seals it (not illustrated) from the elements when not in use. Each of the closures 836 and 840 is pivotably connected to the corresponding one of the first and second objects 804 and 808 and secured in an open position as shown in each of FIGS. 8A and 8B, respectively.

As can be readily appreciated by the shapes and configurations of the pin-pushing contacts 816 and the receptacles 820, the hot-shoe coupling 800 may be characterized as a "straight-in" type coupling in the that the pin-pushing contacts 816 are engaged with the receptacles 820 by moving one, the other, or both of the first and second hot-shoe connectors 800(1) and 800(2) toward one another in a direction normal (generally along lines 844(1) and 844(2), FIGS. 8A and 8B, respectively) to the surfaces 800S(1) and 800S(2) that confront each other when the first and second hot-shoe connectors are fully engaged with one another. As discussed above in connection with relative positions 620 and 632 of FIG. 6A, the coupling system 600 described there is configured to allows for such straight-in type engagement.

Similarly, the first and second objects 804 and 808 of FIGS. 8A and 8B, respectively, includes a coupling system 848 of the present disclosure that is similarly suited to the straight-in-engagement nature of the hot-shoe coupling 800.

Although FIGS. 8A through 8C do not show the first and second objects 804 and 808 coupled together via the first and second coupling parts 848(1) and 848(2) of the coupling system 848, the coupling system 848 includes components that have the same or similar functionality of like component of other coupling systems of the present disclosure discussed above, such as the coupling system 600 of FIGS. 6A through 6C. Consequently, the coupling system 848 works in essentially the same manner as the coupling systems 500 and 600, and, therefore, only major components of the coupling system 848 of FIGS. 8A and 8B are identified, and the reader is left to refer to the descriptions FIGS. 5A through 6C to understand the like coupling operations of the coupling system 848. For convenience and reference, each component of the coupling system 848 is equated the corresponding component in FIGS. 5A through 6C via parenthetical 600-series element identifiers.

In this example, the first coupling part 848(1) (500(1), 600(1)) of FIG. 8A on the first object 804 includes a head 852H (504H) of a pivot connector set 852 (504) and a head 856H (508H) of a locking connector set 856 (508), while the second coupling part 848(2) (500(2), 600(2)) of FIG. 8B on the second object 808 includes the corresponding receivers 852R (504R) and 856R (508R) of the pivot and locking connector sets. The first coupling part 848(1) (FIG. 8A) also includes a throw lever 860L (516L) of a locking mechanism 860 (516), as well as four datum surfaces 864(1) through 864(4) (540(1) through 540(4)). The second coupling part 848(2) (FIG. 8B) includes four datum surfaces 868(1) through 868(4) (544(1) through 544(4)) that firmly receive the datum surfaces 864(1) through 864(4) on the first coupling part 848(1) when the first and second coupling parts are fully coupled with one another.

A hot-shoe assembly for communicating electrical signals between a first and a second objects, the hot-shoe assembly comprising: a first hot-shoe connector designed and configured to be operationally engaged by a second hot-shoe connector having a first set of electrical contacts, the first hot-shoe connector including: a body; and a second set of electrical contacts fixedly located on the body; a swappable component removably coupled to the body and including: a third set of electrical contacts for contactingly engaging the first set of electrical contacts when the first and second hot-shoe connectors are coupled with one another; and a fourth set of electrical contacts in electrical communications with the third set of electrical contacts and contacting the second set of electrical contacts; and a securement means removably securing the swappable component to the body.

A hot-shoe assembly as above, wherein the body includes: a receptacle containing the swappable component; and a closure for temporarily sealing the receptacle from environmental elements.

A hot-shoe assembly as above, wherein the closure is pivotably coupled to the body so as to be pivotable between a sealing position and a hot-shoe-use position.

A hot-shoe assembly as above, wherein the first and second hot-shoe connectors comprise electrical contacts that require substantially straight-in engagement with one another.

A hot-shoe assembly as above, wherein the third set of electrical contacts are recessed within the receptacle.

A hot-shoe assembly as above, wherein the securement mechanism includes a threaded fastener and a threaded receiver that threadedly engage one another.

A hot-shoe assembly as above, wherein the third and fourth sets of electrical contacts are arranged identically with one another.

A hot-shoe assembly as above, wherein the third and fourth sets of electrical contacts are arranged differently from one another.

A coupling system for removably coupling first and second objects to one another, the coupling system comprising: a first coupling part designed and configured to be mechanically coupled to a second coupling part, wherein the first and second coupling parts are configured to be deployed, respectively, on the first and second objects and the first coupling part includes: a body; at least one first coupling component engaged with the body and designed and configured to cooperate with at least one second coupling component located on the second coupling part so as to removable mechanically fix the first and second coupling parts together; and a hot-shoe assembly for communicating electrical signals between the first and second objects, the hot-shoe assembly including: a first hot-shoe connector designed and configured to be operationally engaged by a second hot-shoe connector having a first set of electrical contacts, the first hot-shoe connector including a second set of electrical contacts fixedly located on the body; a swappable component removably coupled to the body and including: a third set of electrical contacts for contactingly engaging the first set of electrical contacts when the first and second hot-shoe connectors are coupled with one another; and a fourth set of electrical contacts in electrical communications with the third set of electrical contacts and contacting the second set of electrical contacts; and a securing means removably securing the swappable passthrough insert to the body.

A coupling system as above, wherein the body includes: an receptacle containing the swappable component; and a closure for temporarily sealing the receptacle from environmental elements.

A hot-shoe assembly as above, wherein the closure is pivotably coupled to the body so as to be pivotable between a sealing position and a hot-shoe-use position.

A coupling system as above, wherein the first and second hot-shoe connectors comprise electrical contacts that require substantially straight-in engagement with one another.

A coupling system as above, wherein the third set of electrical contacts are recessed within corresponding contact receptacles.

A coupling system as above, wherein the securing means includes a threaded fastener and a threaded receiver that threadedly engage one another.

A coupling system as above, wherein the third and fourth sets of electrical contacts are arranged identically with one another.

A coupling system as above, wherein the third and fourth sets of electrical contacts are arranged differently from one another.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A coupling system for removably coupling first and second objects to one another, the coupling system comprising:

a first coupling part corresponding to the first object; and a second coupling part corresponding to the second object and designed and configured to engage the second coupling part and to couple with the first coupling part so as to removably couple the first and second objects to one another when the first and second objects are present;

wherein:

the first and second coupling parts include a pivot connector set and a locking connector set spaced from the pivot connector set along a separation axis extending between the pivot connector set and the locking connector set when the first and second coupling parts are coupled with one another;

the pivot connector set includes a first head and a first receiver located, respectively, on differing ones of the first and second coupling parts, the first receiver including:

a head-receiving region for receiving the first head therethrough when the first head is first engaged with the first receiver; and a head-capture region for capturing the first head in the first receiver after the first head has been engaged with the head-receiving region;

the locking connector set includes:

a second head and a second receiver located, respectively, on differing ones of the first and second coupling parts, wherein the second head is engageable with the second receiver when the first head of the pivot connector set is engaged with the head-capture region of the first receiver; and a locking mechanism for locking the second head in the second receiver when the first head is captured in the head-capture region of the first receiver and the second head is in the second receiver.

2. The coupling system of claim 1, wherein the head-receiving region is located between the head-capture region and the locking connector set.

3. The coupling system of claim 1, wherein:

at least one of the first and second coupling parts is designed and configured to allow a user to engage the first head first with the head-receiving region of the first receiver and then with the head-capture region of the first receiver at an initial-engagement angle; and the second head and the second receiver are configured and located so that the second head is engaged with the second receiver using the head-capture region as a fulcrum to pivot the first and second coupling parts relative to one another so as to close the initial-engagement angle and engage the second head with the second receiver.

4. The coupling system of claim 3, wherein the first coupling part includes a protrusion that, when the first head is engaged with the head-capture region of the pivot connector set, is located between the pivot connector set and the locking connector set and extends toward the second coupling part, wherein the initial-engagement angle is selected so that the protrusion does not contact the second coupling part when the first head is engaged with each of the head-receiving region and the head-capture region.

5. The coupling system of claim 4, wherein the protrusion forms a portion of a first hot-shoe connector, and the second coupling part include a second hot-shoe connector designed and configured to engage one another when the user closes the initial-engagement angle and engages the second head with the second receiver.

6. The coupling system of claim 5, wherein the first hot-shoe connector includes a first set of electrical contacts and the second hot-shoe connector includes:

a second set of electrical contacts fixedly mounted relative to the second coupling part; and a swappable component removably coupled to the second coupling part and including:

a third set of electrical contacts for contactingly engaging the first set of electrical contacts when the first and second coupling parts are coupled with one another; and a fourth set of electrical contacts in electrical communications with the third set of electrical contacts and contacting the second set of electrical contacts.

7. The coupling system of claim 6, wherein the second hot-shoe connector includes:

a receptacle containing the swappable component; and closure for temporarily sealing the receptacle from environmental elements.

8. The coupling system of claim 7, wherein the closure is pivotably coupled to the second coupling part so as to be pivotable between a sealing position and a hot-shoe-access position.

9. The coupling system of claim 5, wherein the first and second hot-shoe connectors comprise electrical contacts that require substantially straight-in engagement with one another.

10. The coupling system of claim 3, wherein at least one of the first and second coupling parts includes an initial-engagement bevel located adjacent to the pivot connector set so as to allow the user to engage the first head first with the head-receiving region of the first receiver and then with the head-capture region of the first receiver at the initial-engagement angle.

11. The coupling system of claim 10, wherein only one of the first and second coupling parts includes the initial-engagement bevel.

12. The coupling system of claim 11, wherein the one of the first and second coupling parts having the initial-engagement bevel has a datum plane, and the initial-engagement bevel forms an angle with the datum plane equal to the initial-engagement angle.

13. The coupling system of claim 11, wherein the initial engagement angle is greater than about 5°.

14. The coupling system of claim 10, wherein:

the first and second coupling parts have a datum plane when coupled with one another;

each of the first and second coupling parts includes an initial-engagement bevel that forms an angle with the datum plane; and the angles formed between the initial-engagement bevels and the datum plan sum to the initial-engagement angle.

15. The coupling system of claim 14, wherein the initial engagement angle is greater than about 5°.

16. The coupling system of claim 1, wherein:

the second head includes an engagement lobe and the second receiver includes a head-locking region; and the locking mechanism includes a pivoting mechanism for, when the second head is inserted into the second receiver, pivoting the engagement lobe into the head-locking region.

17. The coupling system of claim 16, wherein the engagement lobe and the head-locking region include first frusto-conical contact surfaces that are configured so that, when a user operates the pivoting mechanism, the first frusto-conical contact surfaces engage one another and draw the first and second coupling parts into firm engagement with one another.

18. The coupling system of claim 17, wherein the first head and the head-capture region include second frusto-conical contact surfaces that are configured so that, when a user operates the pivot mechanism, the second frusto-conical contact surfaces engages one another and draw the first and second coupling parts into firm engagement with one another.

19. The coupling system of claim 18, wherein each of the head-capture region and the head-locking region have a V-shape along the separation axis, and the V-shapes point in opposite directions relative to one another.

20. The coupling system of claim 16, wherein, when operated to couple the first and second coupling parts with one another, the pivoting mechanism imparts a drawing force between the first and second coupling parts via the engagement lobe, the pivoting mechanism including a force-control feature that controls a magnitude of the drawing force.

21. The coupling system of claim 20, wherein the force-control feature includes a spring mechanism.

22. The coupling system of claim 21, wherein the second head is coupled to a shaft, and the spring mechanism includes at least one spring washer that controls tensile force in the shaft.

23. A hot-shoe assembly for communicating electrical signals between a first and a second objects, the hot-shoe assembly comprising:

a first hot-shoe connector designed and configured to be operationally engaged by a second hot-shoe connector having a first set of electrical contacts, the first hot-shoe connector including:

a body; and a second set of electrical contacts fixedly located on the body;

a swappable component removably coupled to the body and including:

a third set of electrical contacts for contactingly engaging the first set of electrical contacts when the first and second hot-shoe connectors are coupled with one another; and a fourth set of electrical contacts in electrical communications with the third set of electrical contacts and contacting the second set of electrical contacts; and a securement means removably securing the swappable component to the body.

24. A coupling system for removably coupling first and second objects to one another, the coupling system comprising:

a first coupling part designed and configured to be mechanically coupled to a second coupling part, wherein the first and second coupling parts are configured to be deployed, respectively, on the first and second objects and the first coupling part includes:

a body;

at least one first coupling component engaged with the body and designed and configured to cooperate with at least one second coupling component located on the second coupling part so as to removable mechanically fix the first and second coupling parts together; and a hot-shoe assembly for communicating electrical signals between the first and second objects, the hot-shoe assembly including:

a first hot-shoe connector designed and configured to be operationally engaged by a second hot-shoe connector having a first set of electrical contacts, the first hot-shoe connector including a second set of electrical contacts fixedly located on the body;

a swappable component removably coupled to the body and including:

a third set of electrical contacts for contactingly engaging the first set of electrical contacts when the first and second hot-shoe connectors are coupled with one another; and a fourth set of electrical contacts in electrical communications with the third set of electrical contacts and contacting the second set of electrical contacts; and a securing means removably securing the swappable passthrough insert to the body.

* * * * *